(12) United States Patent
Hershko et al.

(10) Patent No.: US 9,081,908 B2
(45) Date of Patent: Jul. 14, 2015

(54) OPERATING M-PHY BASED COMMUNICATIONS OVER SERIAL ADVANCED TECHNOLOGY ATTACHMENT (SATA)-BASED INTERFACE, AND RELATED CABLES, CONNECTORS, SYSTEMS AND METHODS

(71) Applicant: QUALCOMM Incorporated, San Diego, CA (US)

(72) Inventors: Yuval Corey Hershko, Haifa (IL); Yoram Rimoni, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 13/678,461

(22) Filed: Nov. 15, 2012

(65) Prior Publication Data
US 2014/0136750 A1    May 15, 2014

(51) Int. Cl.
*G06F 13/40* (2006.01)
*G06F 13/38* (2006.01)

(52) U.S. Cl.
CPC .......... *G06F 13/4009* (2013.01); *G06F 13/385* (2013.01)

(58) Field of Classification Search
CPC ............................. G06F 13/387; G06F 13/405
USPC ........................................................ 710/315
See application file for complete search history.

(56) References Cited

U.S. PATENT DOCUMENTS

| | | | |
|---|---|---|---|
| 7,179,096 B2 | 2/2007 | Dube et al. | |
| 7,899,948 B2 | 3/2011 | Olschner et al. | |
| 7,990,992 B2 | 8/2011 | Muukki et al. | |
| 8,446,903 B1* | 5/2013 | Ranganathan et al. | 370/359 |
| 2008/0298120 A1 | 12/2008 | Chow et al. | |
| 2009/0052903 A1 | 2/2009 | Mussatt et al. | |
| 2010/0329245 A1 | 12/2010 | Bordogna et al. | |
| 2012/0115371 A1 | 5/2012 | Chuang et al. | |
| 2013/0191568 A1* | 7/2013 | Hershko et al. | 710/106 |
| 2013/0297833 A1* | 11/2013 | Vadivelu et al. | 710/5 |

OTHER PUBLICATIONS

Kempe, Jennifer, "Agilent scope targets MIPI and SATA applications," Test & Measurement, Oct. 21, 2009, pp. 2.
"Mixel Inc.; Mixel First to Market With Unified MIPI/MDDI PHY IP Solution," Oct. 21, 2009, http://www.tmworld.com/electronics-news/4387557/Agilent-scope-targets-MIPI-and-SATA-applications.
International Search Report and Written Opinion—PCT/US2013/070265—ISA/EPO—Mar. 6, 2014.
"MIPI(TM) MPHY—An introduction", Cosmic Circuits, Design & Reuse, pp. 1-4; XP055165646; first published Mar. 3, 2011—see http://web.archive.org/web/201103031050527 http://www.design-reuse.com/articles/25764/mipi-m-phy-ip.html; Retrieved from the Internet: http://www.design-reuse.com/articles/25764/mipi-m-phy-ip.html [retrieved on Jan. 28, 2015].

* cited by examiner

*Primary Examiner* — Glenn A Auve
(74) *Attorney, Agent, or Firm* — Paul S. Holdaway

(57) ABSTRACT

Operating M-PHY communications protocol over a Serial Advanced Technology Attachment SATA-based interface and related devices, systems, and methods are disclosed. In one embodiment, the system operates the M-PHY communications over a SATA interface. Related cables, connectors, systems, and methods are also disclosed. In particular, embodiments of the present disclosure take the M-PHY standard compliant signals and direct them through a SATA compliant connector (and optionally cable) so as to allow two M-PHY standard compliant devices having SATA connectors to communicate.

19 Claims, 9 Drawing Sheets

OPERATING M-PHY BASED COMMUNICATIONS OVER SERIAL ADVANCED TECHNOLOGY ATTACHMENT (SATA)-BASED INTERFACE, AND RELATED CABLES, CONNECTORS, SYSTEMS AND METHODS

BACKGROUND

I. Field of the Disclosure

The technology of the present disclosure relates generally to communications interfaces used for communications between electronic devices.

II. Background

Electronic devices have proliferated throughout society supporting a wide range of applications and uses. As the number and variety of devices expand, there is an increasing need for electronic devices to communicate with one another. In response to this need, various protocols have been proposed and adopted. In many instances, the protocols define signal levels, associated data representations and timing that are communicated between the electronic devices. Examples of these protocols include wireless communications, such as the 802.11 standards set forth by the Institute of Electrical and Electronics Engineers (IEEE) and BLUETOOTH®. Wireless signal protocols may also specify frequency and power levels. Others of these protocols are wire-based. In the event that a protocol is wire-based, a standardized physical connector may be required to effectuate communications between the devices. Various physical connectors, for example Registered Jack-11 (RJ-11), RJ-14, RJ-21, RJ-45, and RJ-49, have been used successfully for various purposes and protocols.

With the increase of mobile platform devices, and the increased functionality in each of these devices, data rates between peripherals have seen exponential growth. In this regard, the Mobile Industry Processor Interface (MIPI®) Alliance has recently proposed the M-PHY® physical layer standard defining a data rate of 10 Kbps to 5.8 Gbps per lane. The M-PHY standard is optimized for mobile applications, such as cameras, displays for mobile terminals, smart phones, and the like. However, while the M-PHY standard provides a serial interface technology with high bandwidth capabilities, the M-PHY specification deliberately avoids connector definitions and advocates for a permanent trace based connection between devices. Permanent trace based connections eliminate the flexibility of user desired connections.

SUMMARY OF THE DISCLOSURE

Embodiments disclosed in the detailed description include operating the M-PHY communications over a Serial Advanced Technology Attachment (SATA)-based interface. Related cables, connectors, systems, and methods are also disclosed. In particular, embodiments of the present disclosure take the M-PHY standard compliant signals and direct them through a SATA compliant connector (and optionally cable) so as to allow two M-PHY standard compliant devices having SATA connectors to communicate.

In this regard, in an exemplary embodiment, an electronic device is configured to operate using the M-PHY standard. The device comprises a communications interface having a plurality of data paths conforming to the M-PHY standard and a SATA-based connector having a plurality of pins. The plurality of pins comprises a A+ pin electrically coupled to a M-PHY TXDP data path of the communications interface and a A− pin electrically coupled to a M-PHY TXDN data path of the communications interface. The plurality of pins comprises a B+ pin electrically coupled to a M-PHY RXDP data path of the communications interface and a B− pin electrically coupled to a M-PHY RXDN data path of the communications interface. Additionally, various methods of insertion detection and power delivery are disclosed.

In another embodiment, an electronic device is configured to operate using a M-PHY standard. The device comprises means for interfacing the electronic device to another device, the interfacing means having a plurality of data paths conforming to the M-PHY standard. The device further comprises a SATA-based connecting means for connecting the interfacing means to another device. The SATA-based connecting means having a plurality of pins comprises a A+ pin electrically coupled to a M-PHY TXDP data path of the means for interfacing and a A− pin electrically coupled to a M-PHY TXDN data path of the means for interfacing. The SATA-based connecting means having a plurality of pins further comprises a B+ pin electrically coupled to a M-PHY RXDP data path of the means for interfacing and a B− pin electrically coupled to a M-PHY RXDN data path of the means for interfacing. In another embodiment, a method of connecting an electronic device configured to operate using a M-PHY standard to a second device is provided. The method comprises providing a plurality of data paths conforming to the M-PHY standard and providing a SATA-based connector having a plurality of pins. The method further comprises electrically coupling a A+ pin to a M-PHY TXDP data path. The method also comprises electrically coupling a A− pin to a M-PHY TXDN data path. The method also comprises electrically coupling a B+ pin to a M-PHY RXDP data path. The method also comprises electrically coupling a B− pin to a M-PHY RXDN data path.

In another embodiment, an electronic device configured to operate using a M-PHY standard is disclosed. The electronic device comprises a communications interface having a plurality of data paths conforming to a M-PHY standard and a SATA-based connector having at least four pins. The SATA-based connector comprises a first two pins configured to couple electrically to a M-PHY transmission data path of the communications interface and a second two pins configured to couple electrically to a M-PHY receive data path of the communications interface.

DETAILED DESCRIPTION

Figure 1A:
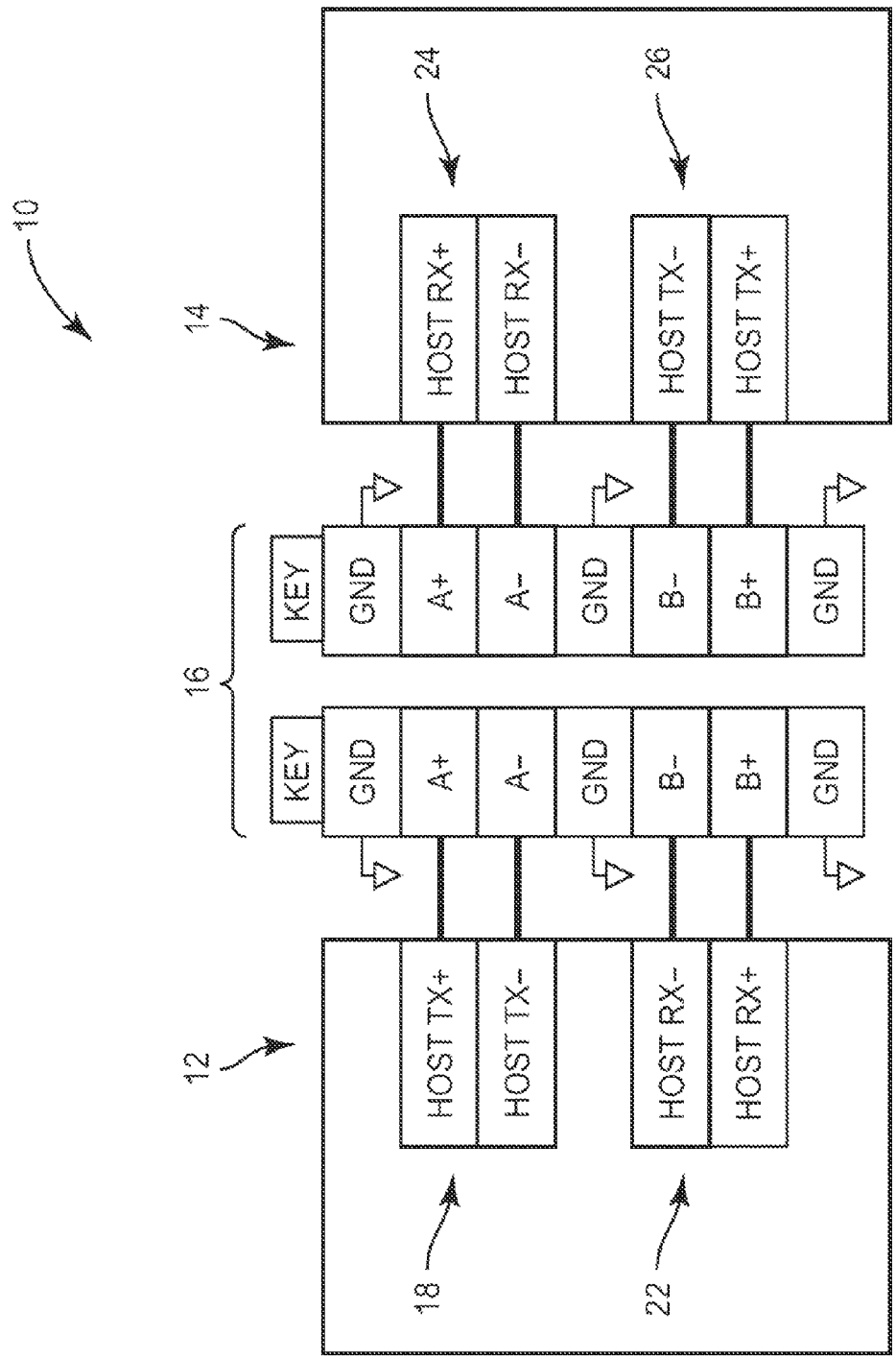
FIG. 1A is a block diagram of an exemplary conventional direct mated Serial Advanced Technology Attachment (SATA) connection between a host and other device.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include operating the M-PHY communications over a Serial Advanced Technology Attachment (SATA)-based interface. Related cables, connectors, systems, and methods are also disclosed. In particular, embodiments of the present disclosure take the M-PHY standard compliant signals and direct them through a SATA compliant connector (and optionally cable) so as to allow two M-PHY standard compliant devices having SATA connectors to communicate.

The Mobile Industry Processor Interface (MIPI®) Alliance has proposed the M-PHY standard, which is a physical layer protocol detailing how devices communicate with one another. However, the MIDI® Alliance has to date, not defined or constrained the M-PHY standard to a particular connector type that complies with the standard, leaving the design of the physical connectors to the entities deploying products in this space. While it is possible to design such a physical connector without reference to any existing connector type, an existing connector is adapted herein to satisfy the signal integrity and other requirements of the MIPI® Alliance M-PHY standard, namely the SATA connector currently used for SATA protocol compliant devices is repurposed for use with M-PHY compliant devices. As a non-limiting example, the SATA connector that is adapted to be used for the MIPI® Alliance M-PHY standard can be a SATA revision 3.1 connector.

SATA is an industry standard introduced to replace the old Parallel AT Attachment format. By 2008, SATA had ninety-nine percent market penetration in the desktop computer market for connecting mass storage devices to a computer bus. The initial SATA standard allowed for a theoretical maximum data rate of 1.5 Gbit/s. SATA 2.0 nominally supports 3.0 Gbit/s. Revision 3.0 of SATA was subsequently introduced in 2008 and provides a theoretical maximum data rate of 6.0 Gbit/s. At the time of this writing, SATA revision 3.1 has been proposed and supports some additional functionality, although the form factor remains backward compatible with the older versions of SATA. More information on the conventional SATA 3.0 or 3.1 standards and connectors can be found at www.sata-io.org/ and in particular, in the Serial ATA Revision 3.1 Specification published on the website, the contents of which are hereby incorporated herein by reference in its entirety. Before discussing the embodiments of adapting the SATA connector to the M-PHY standard, SATA connectors are first discussed with regard to FIGS. 1A-1C.

In this regard, FIG. 1A is an exemplary block diagram of a conventional SATA connection 10. In this exemplary embodiment, the SATA connection 10 is SATA 3.1 compliant and includes a host 12 and a device 14. The device 14 is directly plugged into the host 12 through a mated connector 16. The host 12 includes a transmitter 18, and a receiver 22. The device 14 similarly has a receiver 24 and a transmitter 26. Following the published SATA protocol, the host transmitter 18 sends A+ (TX+) and A– (TX–) signals to the device 14, which treats the incoming signals as A+ (RX+) and A– (RX–) signals respectively. Similarly, the device transmitter 26 sends B+ (TX+) and B– (TX–) signals to the host 12, which treats the incoming signals as B+ (RX+) and B– (RX–) signals respectively. A non-limiting example of this arrangement might be a hard drive (device 14) inserted into a SATA port on a computer (host 12).

Figure 1B:
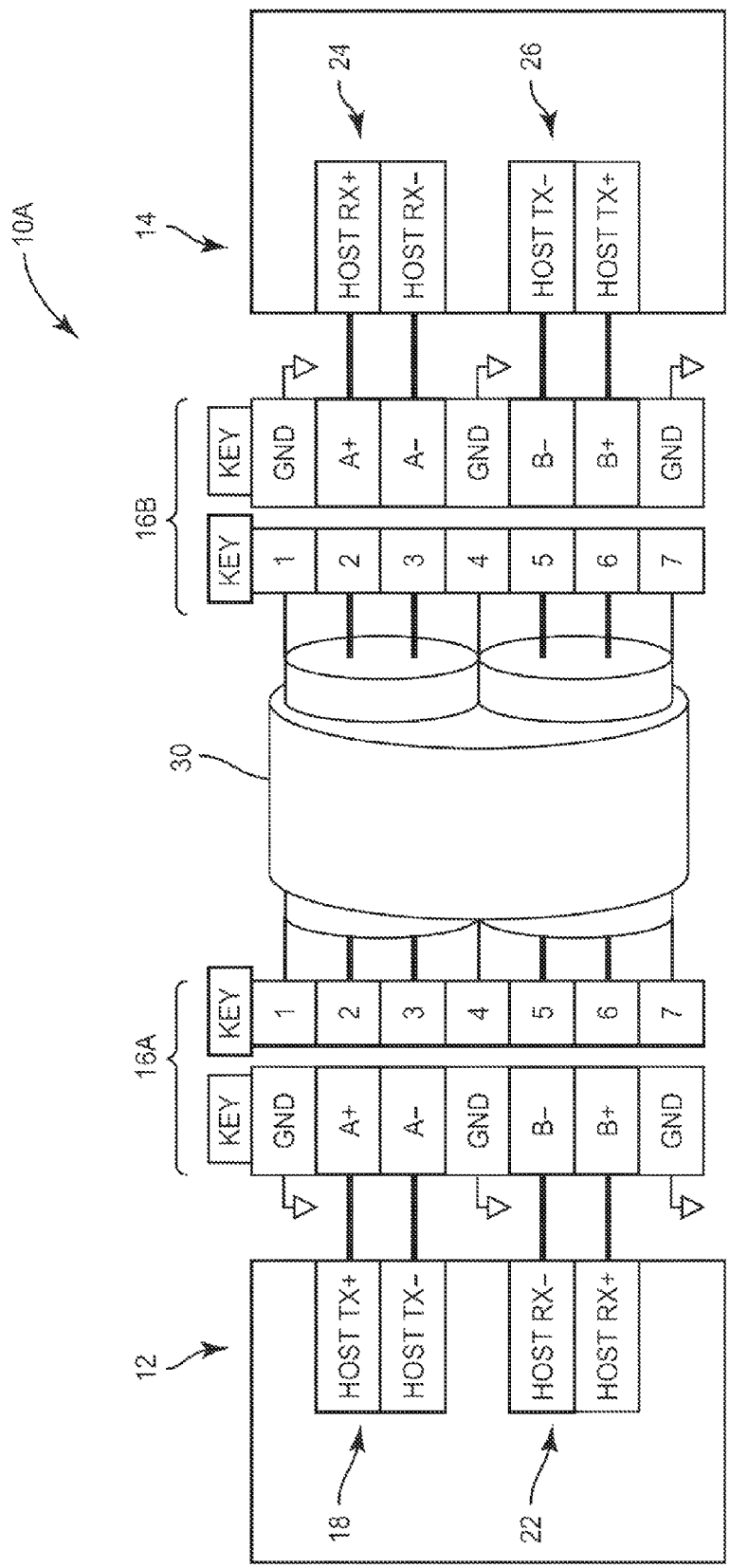
FIG. 1B is a block diagram of an exemplary conventional cable mated SATA connection between a host and other device.

FIG. 1B illustrates a SATA connection 10A similar to the SATA connection 10 in FIG. 1A. However, instead of the mated connector 16, the host 12 may include a connector 16A, and the device 14 includes a connector 16B with a cable 30 extending therebetween. It should be appreciated that connector 16A may be a mated connection, with a plug on the host 12 and a receptacle on the cable 30 and the connector 16B may similarly be a mated connection, with a plug on the device 14 and a receptacle on the cable 30. The cable 30 may also include a plug at one end and a receptacle at the other as is well understood. A non-limiting example of this arrangement might be an external hard drive (device 14) being plugged into a computer (host 12) through a SATA cable (cable 30). While not illustrated, another possibility does exist. That other possibility is a cable with a connector at one end and "hard wired" to the device at the other end.

Figure 1C:
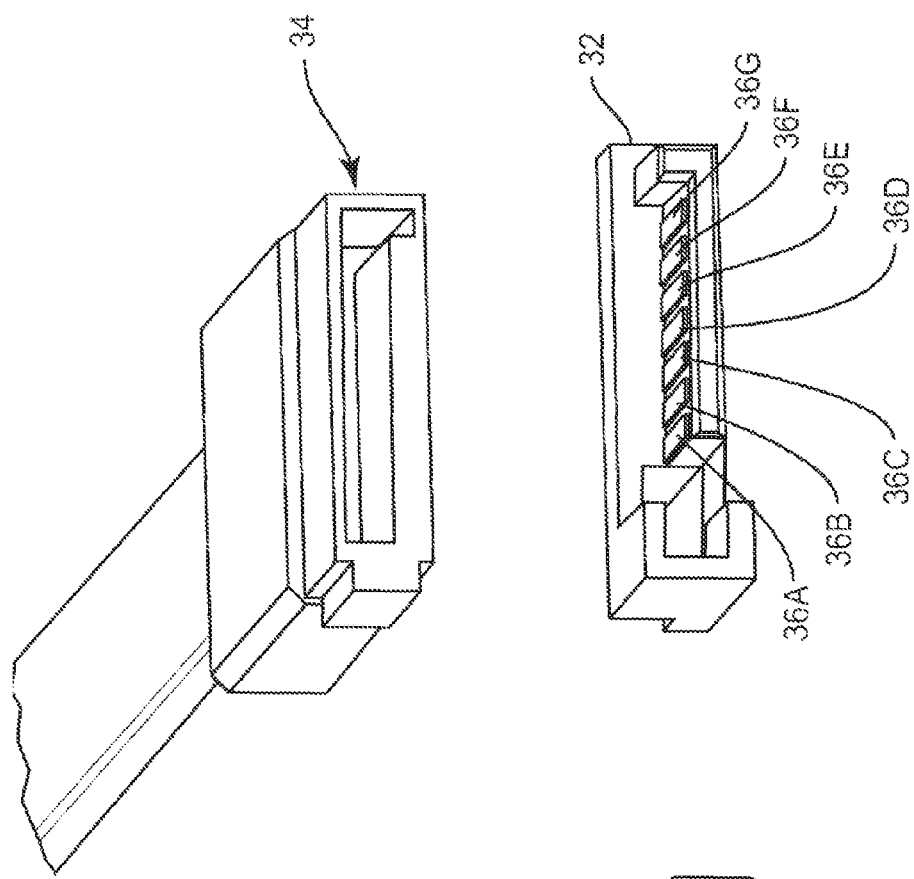
FIG. 1C is a perspective view of a conventional SATA connector.
Figure 1C:
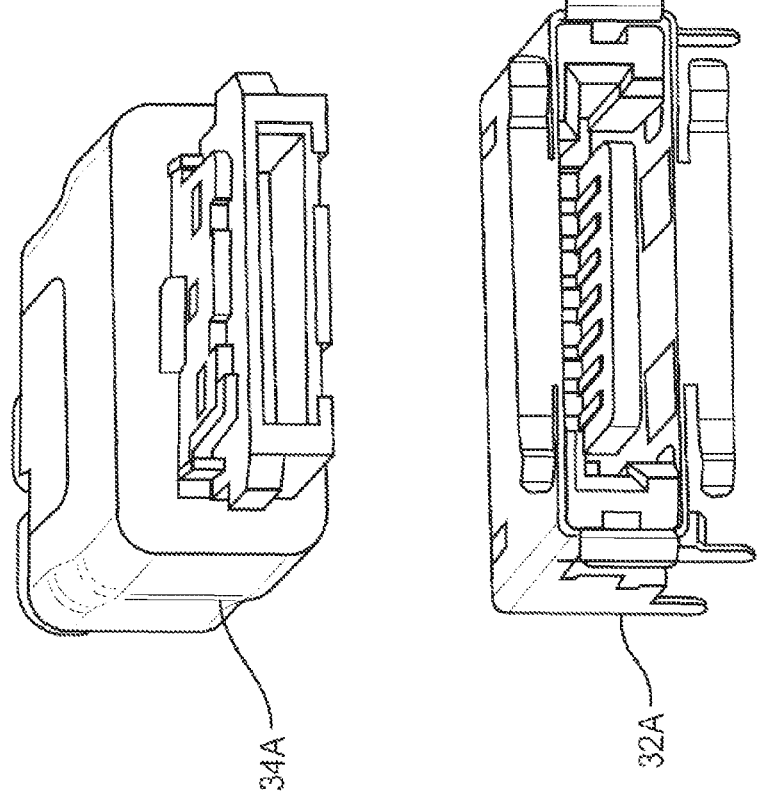

FIG. 1C is a perspective view of an exemplary conventional SATA plug 32 and receptacle 34 as well as an eSATA plug 32A and eSATA receptacle 34A. In particular, the plug 32 includes seven conductive elements or pins. The seven pins 36A-36G (collectively: pins 36) are disposed on the plug 32 and corresponding pins exist in the receptacle 34. As defined by the SATA 3.1 standard, the names and uses of the pins 36A-36G are summarized in TABLE 1 set forth below. Note that TABLE 1 is specifically set forth with reference to a SATA plug, although similar tables are readily available for the other connectors. Additionally, the reference number for the present disclosure is included in TABLE 1 set forth below.

TABLE 1

Conventional SATA Connector Pin Assignment

| SATA 3.1 PIN # | Disclosure # | SATA 3.1 Signal Name | SATA 3.1 Description |
| --- | --- | --- | --- |
| 1 | 36A | GND | GND |
| 2 | 36B | A+ | Transmit Differential |
| 3 | 36C | A– | Pair |
| 4 | 36D | GND | Ground for power |
| 5 | 36E | B– | Receive differential pair |
| 6 | 36F | B+ | |
| 7 | 36G | GND | Ground for signal |

Because the SATA standard is several years old, the industry has had time to develop a standardized connector plug 32 (illustrated in FIG. 1C). There are numerous manufacturers capable of manufacturing SATA 3.1 compliant connectors according to the well-established form factor. Likewise, stress and bend tolerances and other fatigue related tolerances and the like are well understood by those who use such connectors. Many specific definitions and requirements are set forth in the SATA specification and the industry has acclimated to meeting these definitions and requirements.

The present disclosure takes advantage of the familiarity with which industry treats the SATA-based connectors and particularly with plug 32 (and corresponding receptacles 34) and proposes repurposing such connectors for use with M-PHY standard compliant devices. In particular, use of the existing SATA-based connector in an M-PHY standard compliant device allows all the expertise and familiarity the industry has with the SATA-based connector to be leveraged into ready acceptance of its use with M-PHY standard compliant devices. The well-developed manufacturing base allows for ease in securing the connectors for incorporation into M-PHY standard compliant devices. That is, there will be little or no lag time in securing an acceptable manufacturer of connectors for ready inclusion in M-PHY standard compliant devices and the competition between existing manufacturers means that the cost of the individual connectors will likely be reasonable. Similarly, because the connectors are currently made in high volumes, there may be reductions in cost because of appropriate economies of scale.

Figure 2:
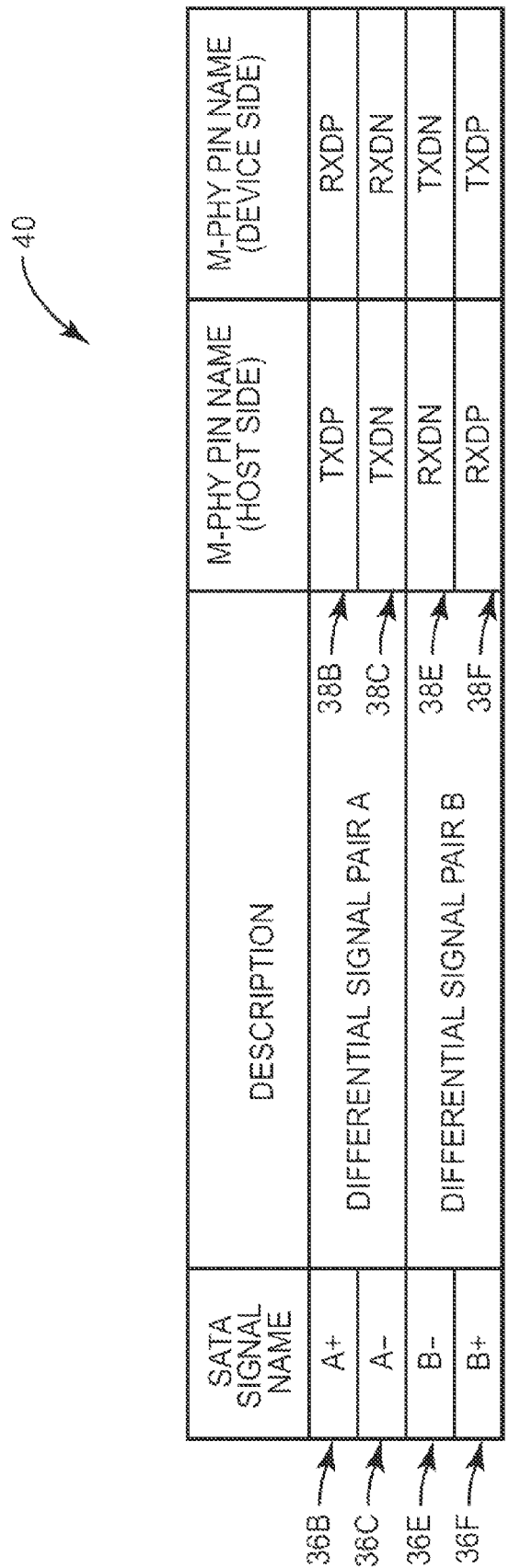
FIG. 2 is a table illustrating an exemplary mapping of SATA pins of a SATA connector to a M-PHY data path for a M-PHY standard.

With reference to FIG. 2, the chart 40 illustrates the mapping of the M-PHY standard compliant pin names to the corresponding SATA 3.1 signal. In particular, FIG. 2 illustrates that pins 36B, 36C, 36E, and 36F are repurposed from their respective SATA signal use to a corresponding M-PHY signal use. Thus, in exemplary embodiments of the present disclosure, pin 36B, which was used for the A+ signal is used for the TXDP signal 38B; the pin 36C which was used for the A− signal is used for the TXDN signal 38C; the pin 36E which was used for the B− signal is used for the RXDN signal 38E; and pin 36F which was used for the B+ signal is used for the RXDP signal 38F. In both the SATA standard and the usage proposed herein, the pins 36B, 36C, 36E, and 36F are used for a receiver differential pair and transmitter differential pair as noted.

Figure 3:
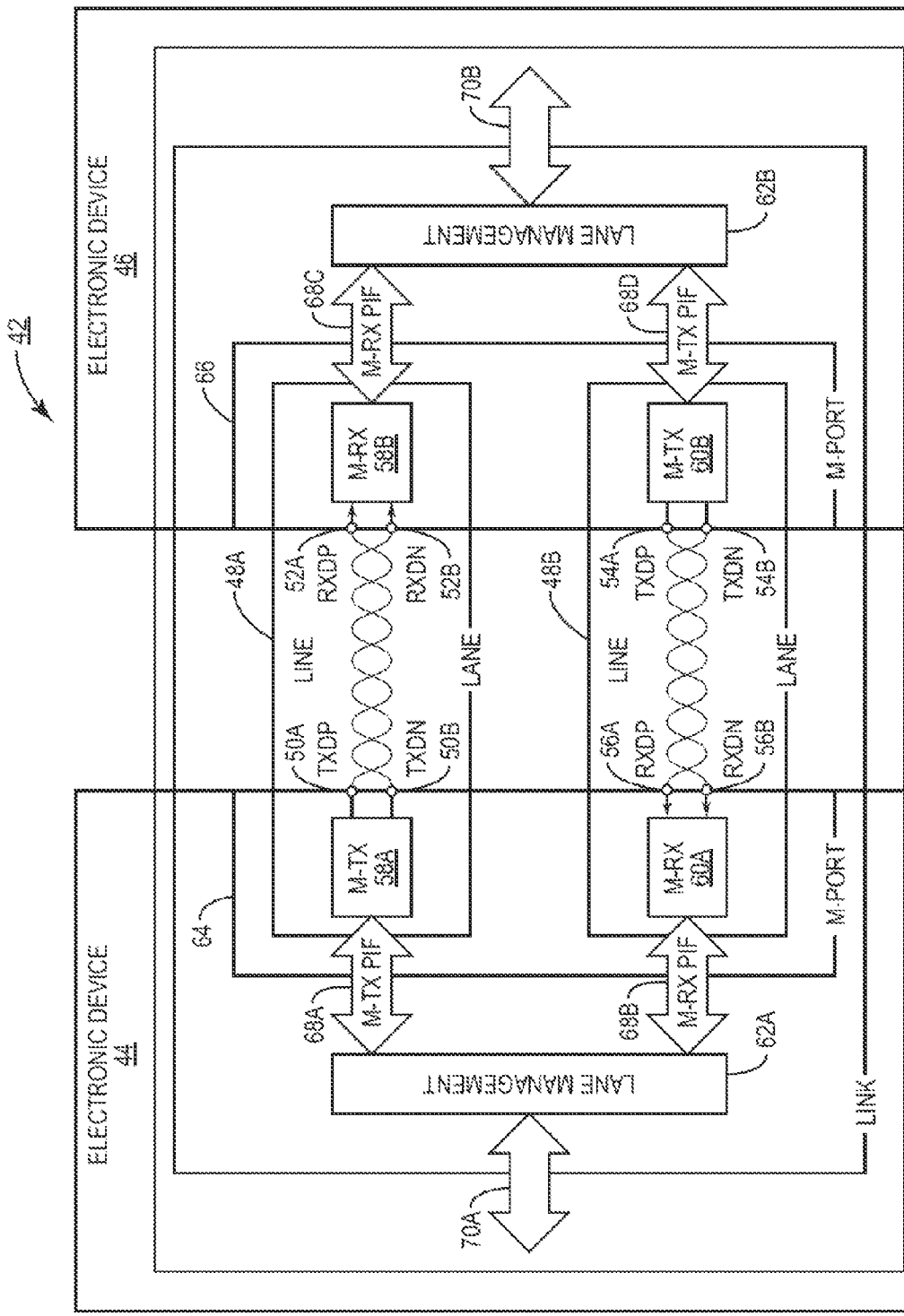
FIG. 3 is a block diagram of an exemplary embodiment of a conventional M-PHY single lane signal path layout for connection of M-PHY standard compliant electronic devices.
Figure 7:
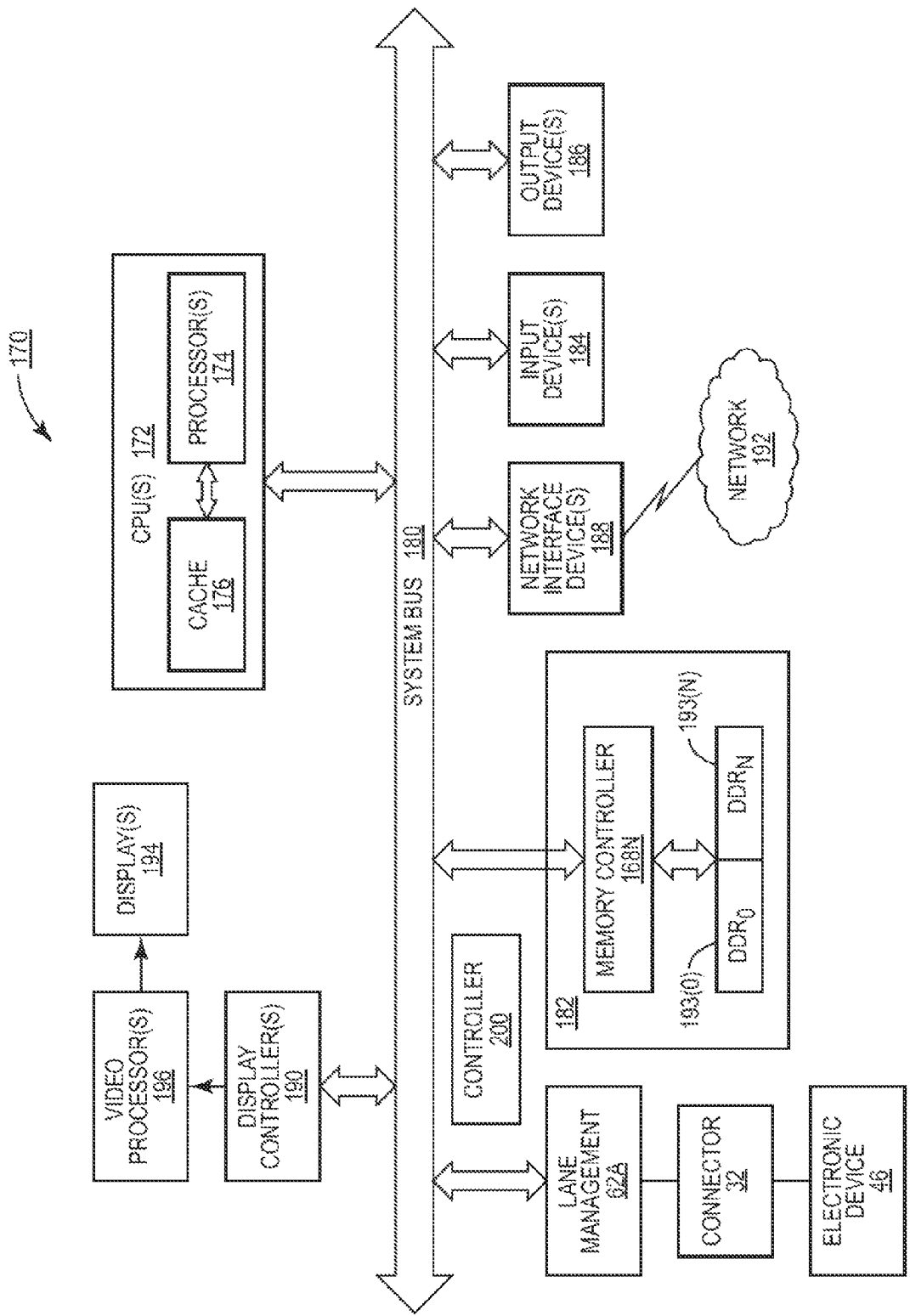
FIG. 7 is a block diagram of exemplary processor-based electronic devices and systems, any of which can include a SATA connector having SATA pins mapped to M-PHY standard data paths according to the embodiments disclosed herein.

An exemplary conventional M-PHY signal path layout 42 with pin requirements is provided with reference to FIG. 3. That is, a first electronic device 44 is connected to a second electronic device 46. The first electronic device 44 can include a control system or processor (discussed below in regard to FIG. 7), which may, through appropriate device drivers, control the signal lanes 48A, 48B of a communications interface (sometimes referred to herein as a means for interfacing) according to the M-PHY standard. The signal lane 48A is the lane through which the first electronic device 44 transmits data to the second electronic device 46 through the TXDP and TXDN pins 50A, 50B to RXDP and RXDN pins 52A, 52B. Likewise, the second electronic device 46 transmits data to the first electronic device 44 through the TXDP and TXDN pins 54A, 54B to RXDP and RXDN pins 56A, 56B. Each electronic device 44, 46 has its own respective transmitter M-TX 58A, 60B and receiver M-RX 60A, 58B controlled by respective lane management module 62A, 62B. The lane management modules 62A, 62B may be hardware or software or a mix of the two as desired and may communicate with the control system via links 70A, 70B. The pins 50A, 50B, 56A, 56B may be in a single M-Port 64, and the pins 52A, 52B, 54A, 54B by virtue of their presence on a second, different device are defined to be in a second M-Port 66.

With continuing reference to FIG. 3, the lane management module 62A may communicate with the transmitter 58A through a peripheral interchange format (PIF) link 68A and with the receiver 60A through a PIF link 68B. Likewise, the lane management module 62B may communicate with the receiver 58B through a PIF link 68C and the transmitter 60B through a PIF link 68D. The lane management modules 62A, 62B, the links 70A, 70B, the transmitters 58A, 60B, receivers 58B, 60A, and PIF links 68A-68D are set forth in the M-PHY standard, and the interested reader is directed thereto for more information regarding these elements. As illustrated, the first electronic device 44 is directly connected to the second electronic device 46. While not explicitly illustrated, it should be appreciated that the direct connection could be replaced by a connector, cable, or combination. Again, the signals and lane management elements are defined by the M-PHY standard, but the arrangement of the pins and any connectors is left undefined. However, as noted with reference to FIG. 2, a SATA-based connector 32 may be repurposed by mapping the pins 36B, 36C, 36E, and 36F to the TXDP 38B, TXDN 38C, RXDN 38E, and RXDP 38F respectively without requiring any physical changes to the connector 32. In this regard, the connector 32 may sometimes be referred to herein as a means for connecting.

Figure 4:
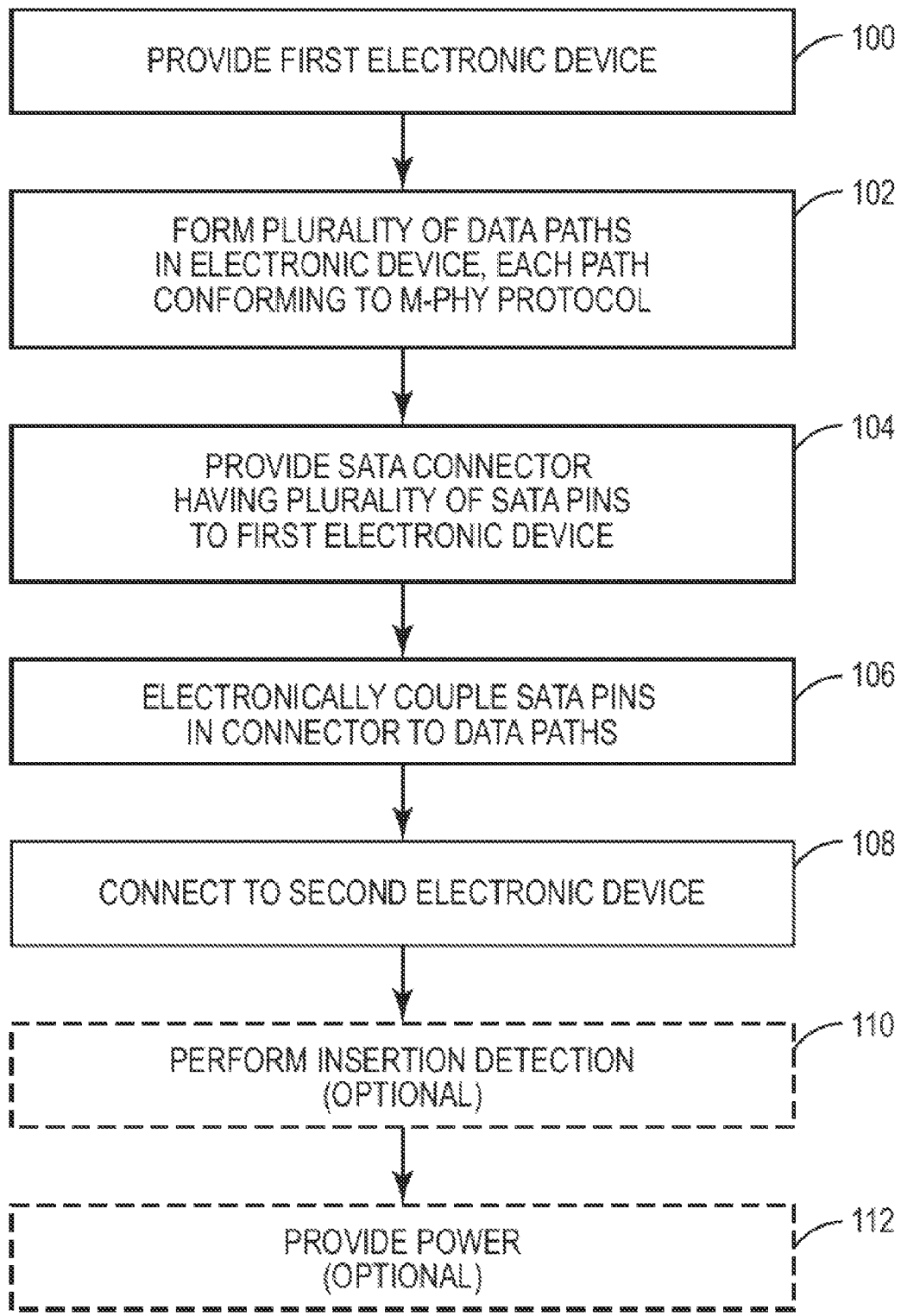
FIG. 4 is a flowchart illustrating an exemplary process for mapping SATA pins of a SATA connector to M-PHY standard data paths.

Turning to FIG. 4, a flow chart is provided illustrating a method of connecting a first electronic device, such as electronic device 44, configured to operating using a M-PHY standard to a second electronic device, such as electronic device 46 through a mated connection, a cable with mated connectors or the like. Initially, the method provides an electronic device (block 100) and forms a plurality of data paths in the electronic device, wherein each path conforms to M-PHY standard (block 102). The method provides a SATA-based connector (e.g., a plug or a receptacle) having a plurality of SATA pins to the electronic device (block 104). In an exemplary embodiment, the SATA-based connector is a SATA plug that conforms to the SATA 3.0 or 3.1 standard.

With continuing reference to FIG. 4, the method electrically couples the pins in the connector to the data paths (block 106). In an exemplary embodiment, the pins 36A-36G are mapped by electrically coupling a first transmit pin (e.g., the A+) to a M-PHY TXDP data path, electrically coupling a second transmit pin (e.g., the A−) to a M-PHY TXDN data path, electrically coupling a first receive pin (e.g., the B−) to a M-PHY RXDN data path, and electrically coupling a second receive pin (e.g., B+) to a M-PHY RXDP data path.

With continuing reference to FIG. 4, and with the data paths connected to the respective pins 36 in the connector 32, the electronic device may be connected to a second electronic device (e.g., second device 46) (block 108). During connection or shortly thereafter, the control system associated with the connector may perform insertion detection (block 110) and/or provide power (block 112) to the second electronic device 46.

The above discussion has focused on repurposing the differential signal pair in the SATA-based connector, but there are other elements within the SATA-based connector that may be used for other purposes such as insertion detection and/or power provision. For example, some SATA-based connectors include a power segment. One such SATA-based connector having a power segment is the SATA internal standard connector. The SATA internal standard connector includes a power segment that allows for insertion detection and provides the ability to supply power to the second electronic device 46. Insertion detection allows the first electronic device 44 to know when it is acceptable to send data or listen for data from the second electronic device 46. Likewise, the second electronic device 46 should detect that the first electronic device 44 has been connected. Other advantages may also be realized through insertion detection, and the present disclosure is not so limited. Likewise, providing power to the second electronic device 46 allows the designers to avoid having to provide a power cord or alternate power source for the second electronic device 46. There are a number of possible configurations which would allow this to happen and which are discussed below.

Figure 5:
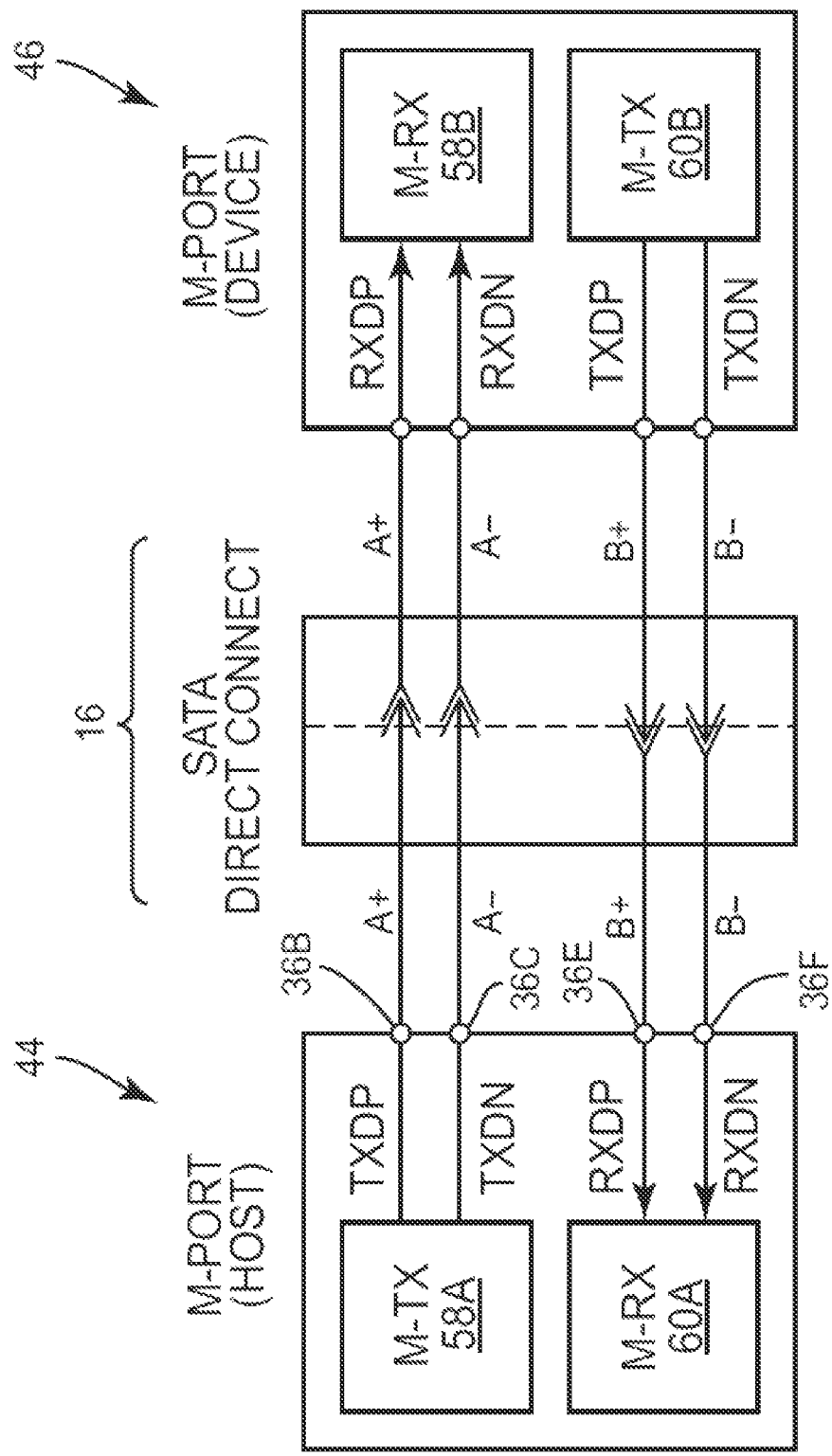
FIG. 5 is a block diagram of an exemplary SATA direct connection repurposed for using M-PHY standard signals.
Figure 6:
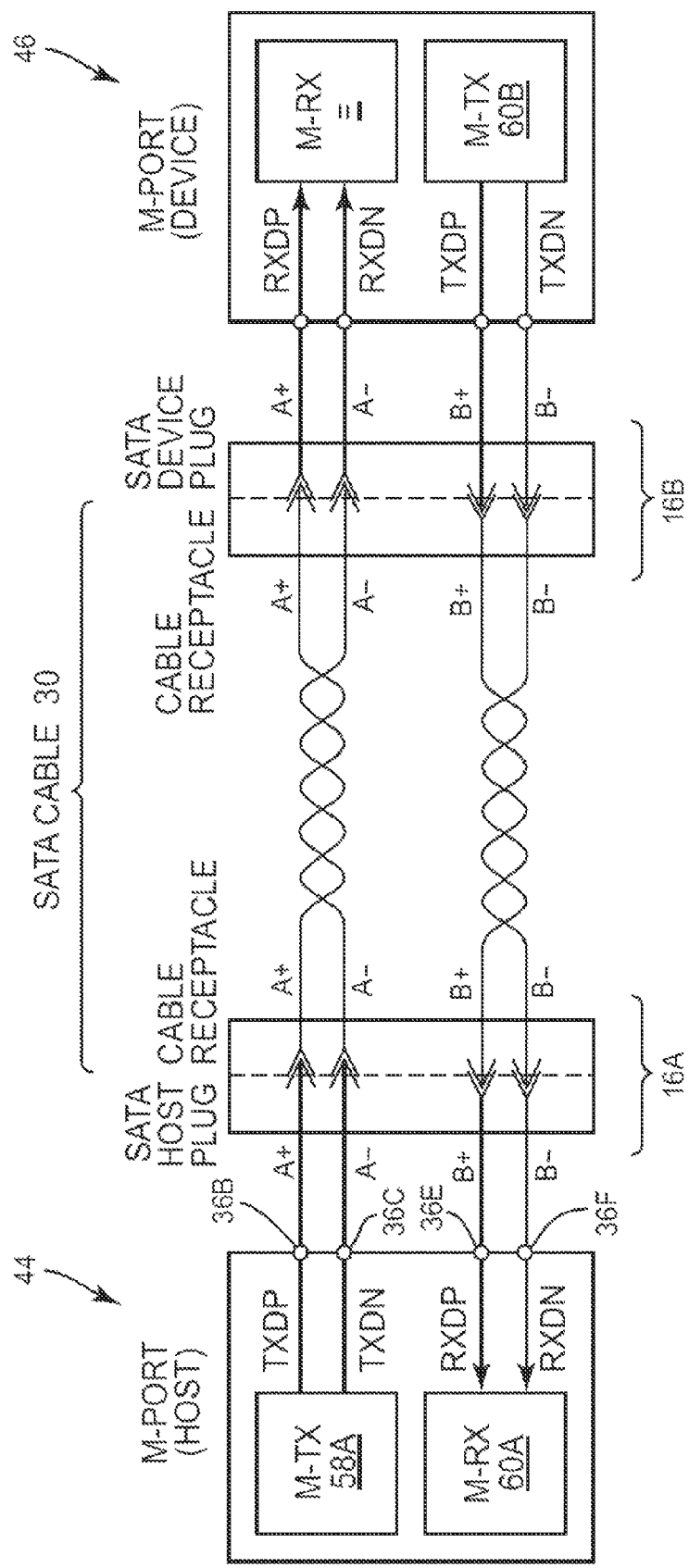
FIG. 6 is a block diagram of a SATA cabled connection repurposed for using M-PHY standard signals.

In this regard, FIGS. 5 and 6 illustrate exemplary diagrams of a first electronic device 44 connected to a second electronic device 46 either directly (FIG. 5) or through a cable 30 (FIG. 6). With reference to FIG. 5, the first electronic device 44 is considered the host and the second electronic device 46 is considered the device. Note that while SATA defines a host and a device (referred to herein as the host and the device), M-PHY does not make this distinction, although the naming convention is preserved in the present disclosure to facilitate the explanation. As described above, pins 36B, 36C, 36E and 36F are used for the data lanes of the M-PHY standard and connectors such as those illustrated in FIG. 1C may be used to effect mated connector 16. Pins 36A and 36G may be used for device detection by connecting the respective pin to a known voltage level and detecting same or by shorting 36A to 36G in the device and detecting the short in the host. Still other insertion detection techniques may be used as desired. Power may be supplied under the SATA standard using a power segment as is well understood.

FIG. 6 similarly shows the first electronic device 44 connected to a second electronic device 46, but through a cable 30. Again, connectors such as those illustrated in FIG. 1C may be used to realize mated connectors 16A and 16B. As discussed above with respect to FIG. 5, pins 36A and 36G may be used for insertion detection and power may be provided through a power segment.

Depending on the quality of the connector and cable (if present) the data lane formed from pins 36B and 36C may not support high data rates. This distinction results from the quality of the shielding and the physical geometries of the pins. However, even if the quality of the connector and the cable does not support high data rates, the data lane formed from pins 36B and 36C is still usable for low data rates, such as the M-PHY LS-MODE PWM data rate.

While the above discussion has focused on a conventional SATA 3.1 connector, other SATA-based connectors may also be used as set forth in TABLEs 2-8 below. The various connectors may allow for variations in power provision, insertion detection, or shared clock capabilities to meet design needs. In addition, the various connectors may have slightly different form factors and thus be useful for different design requirements. While FIG. 1C only illustrates a standard SATA connector and a standard eSATA connector, it should be appreciated that the various alternate connectors discussed below are well known in the industry and the present disclosure provides a novel way of repurposing these connectors to allow interaction with M-PHY compliant devices.

In particular, TABLE 2 sets forth a pin assignment for an internal standard SATA connector.

TABLE 2

Exemplary Internal Standard SATA-M-PHY mapping

| SATA Segment | SATA Pin Name | SATA Pin Type | SATA Pin Description | M-PHY Usage Host | M-PHY Usage Device |
|---|---|---|---|---|---|
| Signal Segment | S1 | GND | Signal ground | Signal ground | Signal Ground Optional: Host detection |
| | S2 | A+ | Differential signal pair A | TXDP | RXDP |
| | S3 | A− | | TXDN | RXDN |
| | S4 | GND | Signal ground | Signal ground | Signal ground |
| | S5 | B− | Differential Signal Pair B | RXDN | TXDN |
| | S6 | B+ | | RXDP | TXDP |
| | S7 | GND | Signal ground | Signal ground Optional: Device detection | Signal Ground |
| Power Segment | P1 | $V_{33}$ | 3.3 V Power | Optional: 3.3 V | Optional: 3.3 V Power |
| | P2 | $V_{33}$ | 3.3 V Power | Power supply | receive |
| | P3 | $V_{33}$ | 3.3 V Power, Pre-charge | | |
| | P4 | GND | Power ground | | Power ground |
| | P5 | GND | Power ground | | Power ground |
| | P6 | GND | Power ground | | Power ground |
| | P7 | $V_5$ | 5 V Power, Pre-charge | Optional: 5 V | Optional: 5 V Power |
| | P8 | $V_5$ | 5 V Power | Power supply | receive |
| | P9 | $V_5$ | 5 V Power | | |
| | P10 | GND | Power ground | | Power ground |
| | P11 | DAS | Vendor specific, others | Optional: Insertion detection | |
| | P12 | GND | Power ground | | Power ground |
| | P13 | $V_{12}$ | 12 V Power, Pre-charge | Optional: 12 V | Optional: 12 V Power |
| | P14 | $V_{12}$ | 12 V Power | Power supply | receive |
| | P15 | $V_{12}$ | 12 V Power | | |

Such an internal standard connector supports M-PHY Type I with a single transmit lane and a single receive lane and may optionally support provision of power to the device and optionally supports insertion detection. It is possible that the signal segment and the power segment might be separate. If they are used together however, power can be provided using the pins that are power pins under the SATA standard. If insertion detection is needed, insertion detection may be provided in at least two ways. The first insertion detection technique may be used if the signal and power segments are used together. In such a case, the host provides power as described in TABLE 2. The device electrically connects (via a short circuit or pull resistor) pin P11 to a known potential (e.g., ground, $V_{33}$, $V_5$, or $V_{12}$). The host detects insertion by checking pin P11 and if the voltage at P11 is at the known potential, then insertion is inferred. The device detects insertion by detecting power on the power segment pins.

With continuing reference to TABLE 2, the second exemplary insertion detection technique works for situations where only the signal segment is used or the signal and power segments are not mechanically coupled together. At the host, both pins S1 and S4 are shorted to ground. At the device, pins S4 and S7 are shorted to ground. On mating of the connector, the host detects that pin S7 is set to ground, indicating that the connection is made. At the device, the device detects that S1 is set to ground indicating that the connection is made. This technique may be referred to herein as the second table insertion technique and variations of this technique are used below by reference to this name.

Note that the same mapping may be applied to the Internal Slimline SATA cables and connectors and support M-PHY Type I or Type II with a single transmit lane and a single receive lane. For the Internal Slimline connectors, power may be provided through the power segment. Insertion detection may be achieved by setting pin P1 to a known voltage as previously described or using the S1, S4, and S7 (i.e., the second table insertion technique) pins as previously described. A shared clock can be provided on pin P4 to support M-PHY Type II.

In addition to the internal standard SATA connector, the present disclosure is also applicable to Internal Multilane Cables, which support two or four data lane configurations as set forth in TABLE 3 below.

ascertained. Similarly, at the device, the device detects that pins 15 and 16 are electrically connected and thus that the device is inserted.

A second insertion detection comparable to the second table insertion technique may also be used. That is, the existence of the short between the pins to ground can be used to detect insertion.

In addition to insertion detection, the multilane cables and connectors may be used to provide a shared clock, supporting the M-PHY Type II. The shared clock may be one of the sideband signals such as on pin 14.

With continuing reference to TABLE 3, if only nineteen pins (e.g. pins 1 to 19) are available, then two data full lanes

TABLE 3

Exemplary Internal Multilane Cable - M-PHY mapping

| SATA Pin Num | SATA Pin Type | SATA Pin Description | M-PHY Usage Host |
|---|---|---|---|
| 1 | GND | Signal ground | Signal ground |
| 2 | RX0+ | Lane 0 receiver differential signal pair | Lane 0 RXDP |
| 3 | RX0− | | Lane 0 RXDN |
| 4 | GND | Signal ground | Signal ground |
| 5 | TX0− | Lane 0 transmitter differential signal pair | Lane 0 TXDN |
| 6 | TX0+ | | Lane 0 TXDP |
| 7 | GND | Signal ground | Signal ground |
| 8 | RX1+ | Lane 1 receiver differential signal pair | Lane 1 RXDP |
| 9 | RX1− | | Lane 1 RXDN |
| 10 | GND | Signal ground | Signal ground |
| 11 | TX1− | Lane 1 transmitter differential signal pair | Lane 1 TXDN |
| 12 | TX1+ | | Lane 1 TXDP |
| 13 | GND | Signal ground | Signal ground |
| 14 | Sideband 0 | Sideband signals | Optional: Shared clock. |
| 15 | Sideband 1 | | Optional: Device detection. |
| 16 | Sideband 2 | | Optional: Host detection. |
| 17 | Sideband 3 | | |
| 18 | Sideband 4 | | |
| 19 | Sideband 5 | | |
| 20 | GND | Signal ground | Signal ground |
| 21 | RX2+ | Lane 2 receiver differential signal pair | Lane 2 RXDP |
| 22 | RX2− | | Lane 2 RXDN |
| 23 | GND | Signal ground | Signal ground |
| 24 | TX2− | Lane 2 transmitter differential signal pair | Lane 1 TXDN |
| 25 | TX2+ | | Lane 1 TXDP |
| 26 | GND | Signal ground | Signal ground |
| 27 | RX3+ | Lane 3 receiver differential signal pair | Lane 3 RXDP |
| 28 | RX3− | | Lane 3 RXDN |
| 29 | GND | Signal ground | Signal ground |
| 30 | TX3− | Lane 3 transmitter differential signal pair | Lane 3 TXDN |
| 31 | TX3+ | | Lane 3 TXDP |
| 32 | GND | Signal ground | Signal ground |

The multilane cable supports M-PHY Type I or Type II with either two transmit lanes and two receive lanes or four transmit lanes and four receive lanes. These cables and connectors only contain signal elements so power is not normally available using these cables and connectors. These cables and connectors may be adapted to provide for insertion detection.

A first insertion detection technique using a multilane cable uses sideband signals available with this type of connector and cable. In the host, pins 15 and 16 are electrically connected. In the device, pins 17 and 18 are electrically connected. Pins 15, 16 and 17, 18 are designated as sideband signals in the SATA standard as noted in TABLE 3. When the connectors are coupled, the host detects that pins 17 and 18 are electrically connected, from which the insertion may be may be provided. In this situation, pins 2, 3, 5, 6, 8, 9, and 11, 12 are used for the two transmit and receive lanes.

There is a version of the multilane cable that has fanout cables wherein the conductors for the sideband signals are not available. The data lane configurations remain unchanged, but the shared clock and the first insertion detection technique are not available. If insertion detection is desired with such cables, the second table insertion technique is used.

The techniques described for the internal multilane cables and connectors may also be extended to the Mini SATA Internal Multilane connectors and cables.

The concepts of the present disclosure may also be extended to an Internal Micro SATA connector as illustrated in TABLE 4.

TABLE 4

Exemplary Internal Micro SATA Connector - M-PHY Mapping

| SATA Segment | SATA Pin Name | SATA Pin Type | SATA Pin Description | M-PHY Usage Host | M-PHY Usage Device |
|---|---|---|---|---|---|
| Signal Segment | S1 | GND | Signal ground | | Signal ground |
| | S2 | A+ | Differential signal pair A | TXDP | RXDP |
| | S3 | A− | | TXDN | RXDN |
| | S4 | GND | Signal ground | | Signal ground |
| | S5 | B− | Differential Signal Pair B | RXDN | TXDN |
| | S6 | B+ | | RXDP | TXDP |
| | S7 | GND | Signal ground | | Signal ground |
| Power Segment | P1 | $V_{33}$ | 3.3 V Power | Optional: 3.3 V Power supply | Optional: 3.3 V Power receive |
| | P2 | $V_{33}$ | 3.3 V Power, Pre-charge | | |
| | P3 | GND | Power ground | | Power ground |
| | P4 | GND | Power ground | | Power ground |
| | P5 | $V_5$ | 5 V Power, Pre-charge | Optional: 5 V Power supply | Optional: 5 V Power receive |
| | P6 | $V_5$ | 5 V Power | | |
| | P7 | DAS | Vendor specific, others | | Optional: Device detection |
| | P8 | Optional | Vendor specific | | Optional: Shared clock |
| | P9 | Optional | Vendor specific | | |

The use of an internal micro SATA connector supports M-PHY Type I or Type II with a single transmit and a single receive lane as well as optional power delivery and optional insertion detection. Additionally a shared clock may be provided, for example on one of the pins P7, P8, or P9. Power may be delivered using the power segment as is well understood in the SATA standard.

Insertion detection may be performed by electrically connecting via a short circuit or pull resistor pin P7, P8, or P9 to a known potential (e.g., ground, $V_{33}$ or $V_5$). The host detects insertion by checking at the selected pin and if the voltage at the selected pin is at the known potential, then insertion is inferred. Alternatively, two pins from the group of P7-P9 on the device may be electrically connected. The host may detect that the two pins are electrically connected to ascertain insertion. If power is provided through the power segment, then the device detects insertion by the existence of power.

The concepts of the present disclosure may also be extended to an Internal LIF-SATA connector as illustrated in TABLE 5 below.

TABLE 5

Exemplary Internal LIF-SATA - M-PHY Mapping

| SATA Pin Name | SATA Pin Type | SATA Pin Description | M-PHY Usage Host | M-PHY Usage Device |
|---|---|---|---|---|
| P1 | GND | Power ground | | Power ground |
| P2 | $V_{33}$ | 3.3 V Power | Optional: 3.3 V Power supply | Optional: 3.3 V Power receive |
| P3 | $V_{33}$ | 3.3 V Power | Optional: 3.3 V Power supply | Optional: 3.3 V Power receive |
| P4 | GND | Power ground | | Power ground |
| P5 | $V_5$ | 5 V Power | Optional: 5 V Power supply | Optional: 5 V Power receive |
| P6 | $V_5$ | 5 V Power | Optional: 5 V Power supply | Optional: 5 V Power receive |
| P7 | GND | Power ground | | Power ground |
| P8 | DAS | Vendor specific, others | | Optional: Device detection Optional: Shared clock |
| P9 | GND | Power ground | | Power ground |
| P10 | GND | Signal ground | | Signal ground |
| P11 | A+ | Differential signal pair A | TXDP | RXDP |
| P12 | A− | | TXDN | RXDN |
| P13 | GND | Signal ground | | Signal ground |
| P14 | B− | Differential Signal Pair B | RXDN | TXDN |
| P15 | B+ | | RXDP | TXDP |
| P16 | GND | Signal ground | | Signal ground |
| P17 | GND | Ground | | Ground |
| P18 | Vendor | Vendor specific | | Optional: Device detection |
| P19 | Vendor | Vendor specific | | Optional: Shared clock |
| P20 | Vendor | Vendor specific | | |
| P21 | DHU | Direct Head Unload | No connect | No connect |
| P22 | Vendor | Vendor specific, no connect on host side | No connect | No connect |
| P23 | Vendor | | No connect | No connect |
| P24 | GND | Ground | | Ground |

The reuse of the Internal LIF-SATA connector supports M-PHY Type I or Type II with a single transmit lane and a single receive lane. Additionally, power delivery may be provided and insertion detection is optionally available. Power may be provided using the designated power pins (e.g., P1-P7). Insertion detection can be performed using the second table insertion technique, but using pins P8, P18, P19, or P20. Alternatively, the host may provide power as indicated and the device has two pins electrically connected such as pins P18 and P19 or any two out of P8, P18, P19, or P20. The host detects that the two pins are electrically connected and the device detects the provision of power. From this detection, insertion may be inferred. A shared clock may be provided for M-PHY Type II using pin P8, P18, P19 or P20.

The concepts of the present disclosure may also be extended to an mSATA connector as set forth in TABLE 6 below.

TABLE 6

Exemplary mSATA - M-PHY Mapping

| SATA Pin Name | SATA Pin Type | SATA Pin Description | M-PHY Usage Host | M-PHY Usage Device |
|---|---|---|---|---|
| P1 | Reserved | No connect | | No connect |
| P2 | +3.3 V | 3.3 V source | Optional: 3.3 V Power supply | Optional: 3.3 V Power receive |
| P3 | Reserved | No connect | | No connect |
| P4 | GND | Return current path | | Ground |
| P5 | Reserved | No connect | | No connect |
| P6 | +1.5 V | 1.5 V source | Optional: 1.5 V Power supply | Optional: 1.5 V Power receive |
| P7 | Reserved | No connect | | No connect |
| P8 | Reserved | No connect | | No connect |
| P9 | GND | Return current path | | Ground |
| P10 | Reserved | No connect | | No connect |
| P11 | Reserved | No connect | | No connect |
| P12 | Reserved | No connect | | No connect |
| P13 | Reserved | No connect | | No connect |
| P14 | Reserved | No connect | | No connect |
| P15 | GND | Return current path | | Ground |
| P16 | Reserved | No connect | | No connect |
| P17 | Reserved | No connect | | No connect |
| P18 | GND | Return current path | | Ground |
| P19 | Reserved | No connect | | No connect |
| P20 | Reserved | No connect | | No connect |
| P21 | GND | Return current path | | Ground |
| P22 | Reserved | No connect | | No connect |
| P23 | +B | Host receiver differential signal pair | RXDP | TXDP |
| P24 | +3.3 V | 3.3 V source | Optional: 3.3 V Power supply | Optional: 3.3 V Power receive |
| P25 | −B | Host receiver differential signal pair | RXDN | TXDN |
| P26 | GND | Return current path | | Ground |
| P27 | GND | Return current path | | Ground |
| P28 | +1.5 V | 1.5 V source | Optional: 1.5 V Power supply | Optional: 1.5 V Power receive |
| P29 | GND | Return current path | | Ground |
| P30 | Two wire interface | Two wire interface clock | Optional: Two wire interface clock | |
| P31 | −A | Host transmitter differential signal pair | TXDN | RXDN |
| P32 | Two wire interface | Two wire interface data | Optional: Two wire interface data | |
| P33 | +A | Host transmitter differential signal pair | TXDP | RXDP |
| P34 | GND | Return current path | | Ground |
| P35 | GND | Return current path | | Ground |
| P36 | Reserved | No connect | | No connect |
| P37 | GND | Return current path | | Ground |
| P38 | Reserved | No connect | | No connect |
| P39 | +3.3 V | 3.3 V source | Optional: 3.3 V Power supply | Optional: 3.3 V Power receive |
| P40 | GND | Return current path | | Ground |
| P41 | +3.3 V | 3.3 V source | Optional: 3.3 V Power supply | Optional: 3.3 V Power receive |
| P42 | Reserved | No connect | | No connect |
| P43 | Device type | Shall be a no connect | | No connect |
| P44 | Reserved | No connect | | No connect |
| P45 | Vendor | Vendor specific, no connect on host side | | No connect |
| P46 | Reserved | No connect | | No connect |
| P47 | Vendor | Vendor specific, no connect on host side | | No connect |

TABLE 6-continued

Exemplary mSATA - M-PHY Mapping

| SATA Pin Name | SATA Pin Type | SATA Pin Description | M-PHY Usage Host | M-PHY Usage Device |
|---|---|---|---|---|
| P48 | +1.5 V | 1.5 V source | Optional: 1.5 V Power supply | Optional: 1.5 V Power receive |
| P49 | DAS/DSS | Device Activity Signal/ Disable Staggered Spin-up | Optional: shared clock | |
| P50 | GND | Return current path | | Ground |
| P51 | Presence detection | Shall be Connected to GND on device | Optional: device detection | Connected to GND |
| P52 | +3.3 V | 3.3 V source | Optional: 3.3 V Power supply | Optional: 3.3 V Power receive |

Usage of the mSATA connector supports M-PHY Type I and Type II with a single transmit lane and a single receive lane. Additionally, this arrangement supports optional power delivery and optional insertion detection. Note that the mSATA connector is designed to operate as either a Peripheral Component Interconnect (PCI) or SATA connector. Currently pin P43 is used to differentiate whether the connector is being used as a PCI or a SATA connector. In a similar manner, pin P36 may be used to designate that the connector is being used as an M-PHY connector.

Power may be delivered through the designated power pins. Insertion detection may be effectuated by connecting pin P51 to a ground on the device side and having the host detect that ground reference. Similarly, the device may detect insertion by the second table insertion technique as has been discussed previously. A shared clock may be provided for M-PHY Type II on any one of the pins P30, P32, or P49.

The concepts of the present disclosure may also be extended to an external single (eSATA) and multilane (xSATA) cable and connector as set forth in TABLE 7 below.

TABLE 7

External MultiLane (xSATA) - M-PHY Mapping

| SATA Pin Num | SATA Pin Signal | M-PHY Usage Host |
|---|---|---|
| S1 | RX0+ | Lane 0 RXDP |
| S2 | RX0− | Lane 0 RXDN |
| S3 | RX1+ | Lane 1 RXDP |
| S4 | RX1− | Lane 1 RXDN |
| S5 | RX2+ | Lane 2 RXDP |
| S6 | RX2− | Lane 2 RXDN |
| S7 | RX3+ | Lane 3 RXDP |
| S8 | RX3− | Lane 3 RXDN |
| S9 | TX3− | Lane 3 TXDN |
| S10 | TX3+ | Lane 3 TXDP |
| S11 | TX2− | Lane 1 TXDN |
| S12 | TX2+ | Lane 1 TXDP |
| S13 | TX1− | Lane 1 TXDN |
| S14 | TX1+ | Lane 1 TXDP |
| S15 | TX0− | Lane 0 TXDN |
| S16 | TX0+ | Lane 0 TXDP |
| G1-G9 | Signal ground | Signal ground |
| Housing | Chassis ground | Chassis ground |

A repurposed eSATA cable or connector supports M-PHY Type I with a single transmit lane and a single receive lane, while a repurposed xSATA cable or connector can support up to four transmit lanes and four receive lanes. As these cables and connectors are for only signal elements, power is not provided through the connector. However, the repurposed connector can be used for insertion detection. Insertion detection may be effectuated by using a wiring scheme for the ground pins. That is, two of the ground pins on the host (e.g., G1 and G3) and two ground pins on the device (e.g., G3 and G5) are electrically connected and the host can determine that the device is connected by detecting the short therebetween and the device can similarly detect the ground to ascertain that the host is connected.

The concepts of the present disclosure may also be extended to a Mini SATA external multilane (xSATA) cable and connector according to TABLE 8 below.

TABLE 8

Exemplary Mini SATA External Multilane (xSATA) - M-PHY mapping

| SATA Pin Num | SATA Pin Signal | M-PHY Usage Host |
|---|---|---|
| A1 | Signal ground | Signal ground |
| A2 | RX0+ | Lane 0 RXDP |
| A3 | RX0− | Lane 0 RXDN |
| A4 | Signal ground | Signal ground |
| A5 | RX1+ | Lane 1 RXDP |
| A6 | RX1− | Lane 1 RXDN |
| A7 | Signal ground | Signal ground |
| A8 | RX2+ | Lane 2 RXDP |
| A9 | RX2− | Lane 2 RXDN |
| A10 | Signal ground | Signal ground |
| A11 | RX3+ | Lane 3 RXDP |
| A12 | RX3− | Lane 3 RXDN |
| A13 | Signal ground | Signal ground |
| B1 | Signal ground | Signal ground |
| B2 | TX0+ | Lane 0 TXDP |
| B3 | TX0− | Lane 0 TXDN |
| B4 | Signal ground | Signal ground |
| B5 | TX1+ | Lane 1 TXDP |
| B6 | TX1− | Lane 1 TXDN |
| B7 | Signal ground | Signal ground |
| B8 | TX2+ | Lane 1 TXDP |
| B9 | TX2− | Lane 1 TXDN |
| B10 | Signal ground | Signal ground |
| B11 | TX3+ | Lane 3 TXDP |
| B12 | TX3− | Lane 3 TXDN |
| B13 | Signal ground | Signal ground |
| Housing | Chassis ground | Chassis ground |

The use of the Mini SATA external multilane cables and connectors supports M-PHY Type I with up to four transmit lanes and four receive lanes. As these cables and connectors only carry signals, they are not well suited to provide power. Insertion detection is optionally supported by selectively coupling ground pins (e.g., B7 and B10 on host and B10 and B13 on device) as previously described.

In still another alternate embodiment, the concepts of the present disclosure could operate on an eSATAp cable and connector. The eSATAp connector combines and eSATA connector with a USB connector and can be repurposed by repurposing the eSATA portion of the connector as described above.

While the present disclosure has focused on repurposing particular pins from the SATA standard to M-PHY usage, it should be noted that any pins on the SATA-based connector can be repurposed to carry the transmitter and receiver differential pair. As a matter of design choice, it makes more sense to repurpose the transmitter and receiver differential pairs from the SATA-based connector to act as transmitter and receiver differential pairs under the M-PHY usage. Likewise, in many instances it makes sense to preserve the purpose of the SATA-based pins in the M-PHY usage. For example, it makes sense to preserve a ground connection as a ground connection. Likewise, pins that are designated as power pins under the SATA-based system may be preserved as power pins in the M-PHY system. Such preservation of pin functionality promotes interoperability and allows designers familiar with one system to adapt readily to pin layouts in the repurposed system.

The operation of the M-PHY communications protocol over a SATA interface and related devices, systems, and methods, according to embodiments disclosed herein, may be provided in or integrated into any processor-based device. Examples, without limitation, include a set top box, an entertainment unit, a navigation device, a communications device, a fixed location data unit, a mobile location data unit, a mobile phone, a cellular phone or smart phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

In this regard, FIG. 8 illustrates an example of a processor-based system 170 that can employ the connector plug 32 illustrated in FIG. 1C (or other SATA compliant plug or receptacle), with the mapping of FIG. 2 (in any of the configurations set forth above or other comparable configurations tailored to a different plug or receptacle) applied thereto. A controller 200 interoperates with the lane management module 62A as illustrated. In this example, the processor-based system 170 includes one or more central processing units (CPUs) 172, each including one or more processors 174. The CPU(s) 172 may be a master device. The CPU(s) 172 may have cache memory 176 coupled to the processor(s) 174 for rapid access to temporarily stored data. The CPU(s) 172 is coupled to a system bus 180 and can intercouple master devices and slave devices included in the processor-based system 170. The system bus 180 may be a bus interconnect. As is well known, the CPU(s) 172 communicates with these other devices by exchanging address, control, and data information over the system bus 180. For example, the CPU(s) 172 can communicate bus transaction requests to the memory controller 168(N) as an example of a slave device. Although not illustrated in FIG. 8, multiple system buses 180 could be provided, wherein each system bus 180 constitutes a different fabric.

Other master and slave devices can be connected to the system bus 180. As illustrated in FIG. 8, these devices can include a memory system 182, one or more input devices 184, one or more output devices 186, one or more network interface devices 188, and one or more display controllers 190, as examples. The input device(s) 184 can include any type of input device, including but not limited to input keys, switches, voice processors, etc. The output device(s) 186 can include any type of output device, including but not limited to audio, video, other visual indicators, etc. The network interface device(s) 188 can be any devices configured to allow exchange of data to and from a network 192. The network 192 can be any type of network, including but not limited to a wired or wireless network, private or public network, a local area network (LAN), a wide local area network (WLAN), and the Internet. The network interface device(s) 188 can be configured to support any type of communication protocol desired. The memory system 182 can include one or more memory units 193(0-N). The arbiter may be provided between the system bus 180 and master and slave devices coupled to the system bus 180, such as, for example, the memory units 193(0-N) provided in the memory system 182.

The CPU 172 may also be configured to access the display controller(s) 190 over the system bus 180 to control information sent to one or more displays 194. The display controller(s) 190 sends information to the display(s) 194 to be displayed via one or more video processors 196, which process the information to be displayed into a format suitable for the display(s) 194. The display(s) 194 can include any type of display, including but not limited to a cathode ray tube (CRT), a liquid crystal display (LCD), a plasma display, etc.

The CPU(s) 172 and the display controller(s) 190 may act as master devices to make memory access requests to an arbiter over the system bus 180. Different threads within the CPU(s) 172 and the display controller(s) 190 may make requests to the arbiter.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electronic device configured to operate using a M-PHY standard, comprising:
   a communications interface having a plurality of data paths conforming to the M-PHY standard; and
   a SATA-based connector having a plurality of pins, comprising:
     a A+ pin electrically coupled to a M-PHY TXDP data path of the communications interface;
     a A− pin electrically coupled to a M-PHY TXDN data path of the communications interface;
     a B+ pin electrically coupled to a M-PHY RXDP data path of the communications interface; and
     a B− pin electrically coupled to a M-PHY RXDN data path of the communications interface.

2. The device of claim 1, wherein other pins of the plurality of pins are configured to allow insertion detection.

3. The device of claim 1, wherein other pins of the plurality of pins are configured to provide power therethrough.

4. The device of claim 1, wherein other pins of the plurality of pins are configured to provide an additional data channel therethrough.

5. The device of claim 1, wherein the SATA connector conforms to a SATA Revision 3.1 standard.

6. The device of claim 1, wherein the SATA-based connector comprises an element selected from the group consisting of: a plug, a socket, and a plug with a cable.

7. The device of claim 1 integrated into a semiconductor die.

8. The device of claim 1, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the electronic device is integrated.

9. An electronic device configured to operate using a M-PHY standard, comprising:
   means for interfacing the electronic device to another device, the interfacing means having a plurality of data paths conforming to the M-PHY standard; and
   a SATA-based connecting means for connecting the interfacing means to another device, the SATA connecting means having a plurality of pins comprising:
     a A+ pin electrically coupled to a M-PHY TXDP data path of the means for interfacing;
     a A− pin electrically coupled to a M-PHY TXDN data path of the means for interfacing;
     a B+ pin electrically coupled to a M-PHY RXDP data path of the means for interfacing; and
     a B− pin electrically coupled to a M-PHY RXDN data path of the means for interfacing.

10. The device of claim 9, wherein the interfacing means comprises a communications interface.

11. The device of claim 9, wherein the means for connecting comprises a SATA-based connector.

12. The device of claim 9, wherein the means for connecting comprises a SATA Revision 3.1 compliant connector.

13. A method of connecting an electronic device configured to operate using a M-PHY standard to a second device, comprising:
   providing a plurality of data paths conforming to the M-PHY standard;
   providing a SATA-based connector having a plurality of pins;
   electrically coupling a A+ pin to a M-PHY TXDP data path;
   electrically coupling a A− pin to a M-PHY TXDN data path;
   electrically coupling a B+ pin to a M-PHY RXDP data path; and
   electrically coupling a B− pin to a M-PHY RXDN data path.

14. The method of claim 13, further comprising detecting insertion of the SATA-based connector.

15. The method of claim 13, further comprising providing power through the SATA-based connector.

16. The method of claim 13, further comprising providing an additional data channel.

17. The method of claim 13, wherein providing the SATA connector comprises providing a SATA-based connector conforming to a SATA Revision 3.1 standard.

18. An electronic device configured to operate using a M-PHY standard, comprising:
   a communications interface having a plurality of data paths conforming to a M-PHY standard; and a SATA-based connector having at least four pins, comprising:
   a first two pins configured to couple electrically to a M-PHY transmission data path of the communications interface; and
   a second two pins configured to couple electrically to a M-PHY receive data path of the communications interface.

19. The electronic device of claim 18, wherein the SATA-based connector preserves ground connections from the SATA format to the M-PHY format.

* * * * *